April 8, 1947. E. R. BOLAND 2,418,456
PARACHUTE
Filed Aug. 14, 1944 5 Sheets-Sheet 1

Inventor
Edward R. Boland
By Thomas A. Jenckes
Attorney

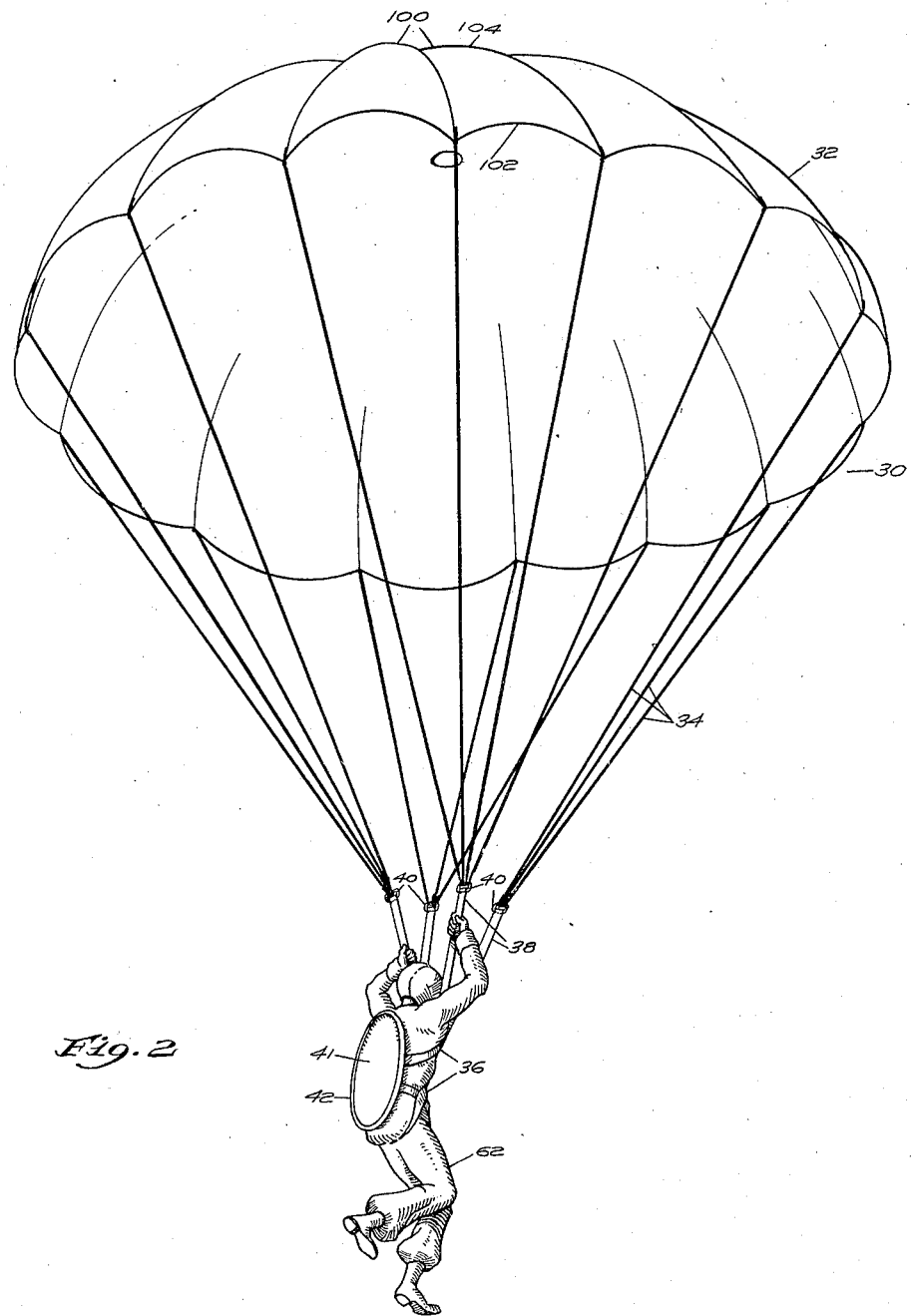

April 8, 1947.   E. R. BOLAND   2,418,456
PARACHUTE
Filed Aug. 14, 1944   5 Sheets-Sheet 3

Inventor
Edward R. Boland
by Thomas A. Jenckes
Attorney

April 8, 1947. E. R. BOLAND 2,418,456
PARACHUTE
Filed Aug. 14, 1944 5 Sheets-Sheet 4

Inventor
Edward R. Boland
by Thomas A. Jenckes
Attorney

Fig.12
Fig.112
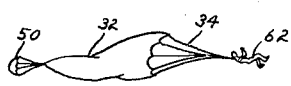
Fig.13
Fig.113
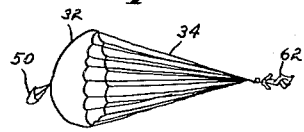
Fig.14
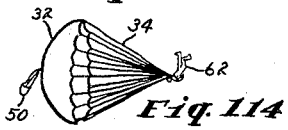
Fig.114
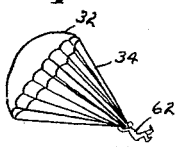
Fig.15
Fig.115
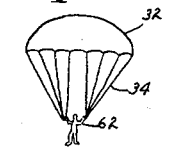
Fig.16
Fig.116
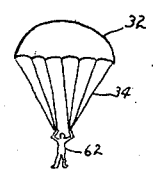
Fig.17
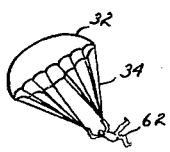
Fig.117a
Fig.18
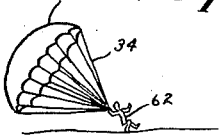
Fig.117b
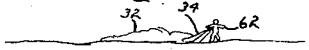
Fig.19
Fig.118
Fig.119
Inventor
Edward R. Boland
by Thomas A. Jenckes
Attorney Patented Apr. 8, 1947

2,418,456

UNITED STATES PATENT OFFICE 2,418,456

PARACHUTE

Edward R. Boland, Fairhaven, Mass., assignor of one-fifth to Thomas A. Jenckes, Lonsdale, R. I.

Application August 14, 1944, Serial No. 549,319

2 Claims. (Cl. 244—142)

My invention relates to improvements in parachutes.

An object of my invention is to provide a parachute in which the shock of opening the parachute on the parachutist is substantially reduced, if desired, being substantially eliminated.

A further object of my invention is to provide a parachute in which the oscillations thereof after opening of the canopy are substantially eliminated so that the parachutist may be yieldingly carried in a vertical position as he drops and so that he may land with lessened shock substantially in a vertical position instead of being tilted and knocked sideways on landing as has often happened with previous types of parachutes, in other words a parachute in which the parachutist "rides on the rubber" as he drops.

A further object of my invention is to provide a parachute in which as the parachutist strikes the ground the suspension means rapidly contracts to a fully contracted position to temporarily steady the parachutist in a vertical position and to immediately pull the canopy to a collapsed position preventing any dragging of the parachutist by an open canopy over the ground after he has landed.

A further object of my invention is to provide a parachute in which all three previous objects set forth in the three preceding paragraphs are combined to provide a parachute which will at least sharply reduce the shock of opening, substantially prevent oscillation during dropping and which will insure that the parachutist be landed with lessened shock in a vertical position with the canopy immediately collapsed.

A further object of my invention is to provide a parachute which may be used with the same advantages in dropping material, equipment, supplies, mail, etc.

A further object of my invention is to provide a parachute which may be readily steered by taking up slack on individual shroud lines without providing slack in the shroud lines to become twisted around any part of the parachutist.

A further object of my invention is to provide a parachute which opens more quickly and easily than former types, obviating, if desired, the necessity of a pilot chute.

A further object of my invention is to provide a parachute having elastic suspension means consisting of a set of shroud lines, each normally urged to a contracted position to provide a contracted short length for packing purposes so that the suspension means, i. e. the shroud lines, may be readily packed in a small compass thereby obviating the long shroud lines formerly thought necessary with their tendency to fuse on rubbing contact with each other in opening, and to tangle with the canopy or parachutist or with each other as the parachute opens.

A further object of my invention is to provide a parachute in which the elastic suspension means or shroud lines are so constructed that they do not become brittle in use.

A further object of my invention is to provide a parachute for a pilot, paratrooper or other plane occupant having such elastic suspension means or shroud lines that they will cushion the impact or shock on opening of the canopy and for this purpose the shroud lines for use with an adult parachutist are so constructed that each will withstand a weight of 12½–50 lbs. so that from about 160 to about 1600 lbs. of the impact shock will be taken up and that as the parachute sinks to a vertical position then merely carrying the weight of the parachutist of about 150 lbs. there will be such a reserve of elasticity as to yieldingly carry the parachutist in a vertical position as he drops with sufficient reserve of elasticity to substantially prevent any tendency of the canopy to oscillate from being imparted to the parachutist. It is obvious however that when dropping youths or material, the poundage of necessity will have to be similarly varied.

A further object of my invention is to provide a novel structure of such elastic shroud lines as to make this provision of sufficient elasticity to take up and yieldingly cushion the opening shock and of sufficient reserve elasticity during dropping to substantially eliminate oscillation, to this end incorporating in each shroud a multiplicity of individual thoroughly cured rubber strands of less than size 20 (to the inch) so that the rubber may be fully cured so as to be capable of the desired 200–500 per cent expansion to take up the opening shock of impact and to provide the reserve of elasticity heretofore mentioned.

A further object of my invention is to provide a construction in which the elasticity of the shroud lines is preferably so great as to materially aid in opening up the parachute.

A further object of my invention is to provide a parachute having less shroud lines than formerly thought necessary as the rubber or other elastic material takes up so much of the shock of impact that the strength of the braided covering may be materially lessened and/or the number of lines correspondingly reduced.

A further object of my invention is to so shape and construct the canopy and connect the shroud lines to the edge of said canopy at such spaced intervals that the canopy will readily open up and stay open during the drop.

A further object of my invention where fewer shroud lines than formerly thought necessary are used, is to provide large sector-shape buoyant anti-collapse lobes intermediate the connections of the shroud lines to the canopy to balloon upwards particularly near the edge of the canopy to supplementally assist in preventing the canopy from collapsing. This is particularly true where a shallow so called "flat top" or "paratrooper chute" canopy is employed although where a "deep" parachute canopy of the standard United States Army or Navy aeroplane type nearly hemispherical type or a conical type canopy is employed, however, I have found that the number of lead lines is less material although care should be taken in every case not to have them so close together and of such great amount of elasticity as to prevent the device from opening up in use.

These and such other objects of my invention as may hereinafter appear will be best understood from a description of embodiments thereof such as are shown in the accompanying drawings.

In the drawings:

Fig. 2 is a perspective view of the embodiment of my invention shown in Fig. 1 employing such a small number of shroud lines so spaced as to provide large sector shaped buoyant anti-collapse lobes between each shroud line, showing the parachute and parachutist dropping in a vertical position.

Figure 6:
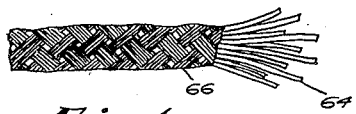
Figure 7:
Figures 8, 9:
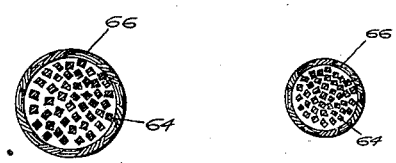

Figs. 6–9 illustrate one embodiment of shroud line constructed in accordance with my invention having an elastic core comprising a multiplicity of small rubber strands and a stretchable braided covering, Fig. 6 being a side elevation of the same in contracted position, Fig. 7 being a side elevation of the same in an extended position, Fig. 8 being a cross-sectional view of same in contracted position and Fig. 9 being a cross-sectional view of same in extended position.

Figure 10:
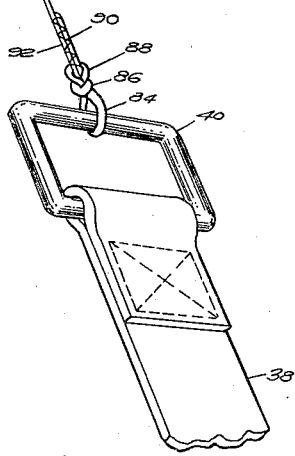

Fig. 10 is a diagrammatic side elevation showing an embodiment of my invention applied on a "shallow" paratrooper canopy with 14 shroud lines.

Figure 11:
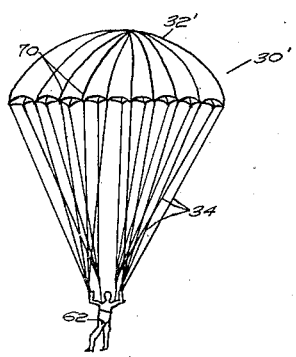

Fig. 11 is a diagrammatic side elevation showing an embodiment of my invention applied on a standard "deep" Army or Navy type aeroplane canopy with a large number (24) of shroud lines.

Figure 1:
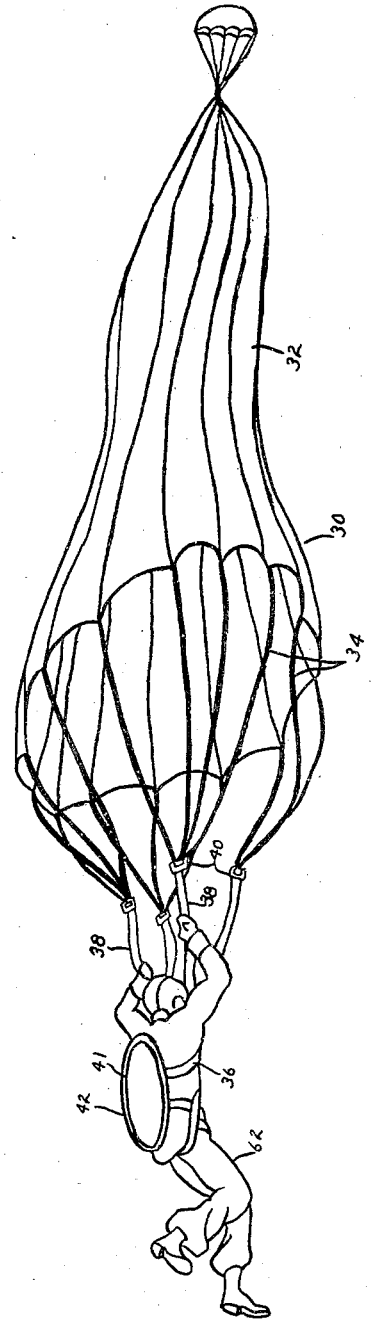
Fig. 1 is a side elevation of one embodiment of "shallow" parachute constructed in accordance with my invention showing the position it assumes relative to the parachutist immediately after the parachutist has jumped from an aeroplane prior to any real opening of the canopy and stretching of the elastic shroud lines.

Figs. 12–19 diagrammatically illustrate the positions my improved parachute assumes after it is dropped from a moving aeroplane with ripcord pulled, until it lands, said figures showing the positions the parachute and parachutist assume during the course of said drop, Fig. 12 showing the pilot chute open, parachute substantially closed and shroud lines contracted with the parachute and parachutist substantially in a horizontal position just after the parachutist jumps from a moving plane and with the pilot chute opening up the parachute, Fig. 13 illustrating the positions assumed immediately thereafter as the parachute commences to open and the shroud lines commence to extend, being substantially the same position shown in more detail in Fig. 1, Fig. 14 illustrating the position the parachute assumes as the canopy opens up showing how the shroud lines expand to their fully extended position to at least partially cushion the impact shock of opening, Fig. 15 illustrating the parachute in the act of tilting from a horizontal to a vertical position as the impact shock is cushioned and/or taken up and the parachutist starts to drop with the shroud lines starting to contract to yieldingly support the weight of the parachutist to make him "ride on the rubber," Fig. 16 illustrating the vertical position my improved parachute assumes during the remainder of the drop, the reserve elasticity in the partially contracted shroud lines preventing it from oscillating beyond a vertical center line as it is tilted from a horizontal to a vertical position, Fig. 17 generally similar to Fig. 2 illustrating how the parachute continues to drop with the parachutist in a vertical position with the shroud lines still partially contracted, Fig. 18 illustrating the position the parachutist and canopy assume as the parachutist strikes the ground in a vertical position and Fig. 19 illustrating the positions assumed immediately thereafter with the parachutist being given a temporary lift to remain standing and the shroud lines quickly contracting to pull the canopy to a fully collapsed position.

Figs. 112–119 illustrate what takes place in a standard parachute in dropping from a plane to a landing, Fig. 112 being identical in point of time to Fig. 12 and being substantially similar thereto with the exception of having longer shroud lines to tangle the parachutist, Fig. 113 being identical in point of time to Fig. 13 and substantially similar thereto with the exception that the shroud lines are still so long that they may entangle the parachutist, Fig. 114 being similar in point of time to Fig. 14 but showing the entire force of the opening shock being transmitted through the continuous relatively short shroud lines to the parachutist, Fig. 115 being similar in point of time to Fig. 15 but showing how the parachute tilts with the taut lead lines transmitting all shocks to the parachutist, Fig. 116 being similar in point of time to Fig. 16, Fig. 117$^a$ showing the position a standard parachute attains with the parachutist continuing to oscillate past a center like a pendulum to an opposite position after the parachutist has dropped to a vertical position and Fig. 117$^b$ showing how it maintains the oscillations imparted by this pendulum-like action throughout the descent, Fig. 117$^b$ also illustrating what happens when a gust of wind strikes the parachutist causing the parachute to oscillate instead of remaining in a vertical position as shown in Fig. 17, Figs. 117$^a$ and 117$^b$ thus being identical in point of time to Fig. 17, Fig. 118 being identical in point of time to Fig. 18 illustrating how the parachutist usually strikes the ground while the parachute is oscillating to give him a lateral blow and throw him off balance and Fig. 119 being similar in point of time to Fig. 19 illustrating how the canopy remains open tending to drag the parachutist over the ground for a considerable length of time after he has landed.

In the drawings, wherein like characters of reference indicate like parts throughout, 30 and 30' generally indicate a parachute constructed in accordance with my invention. Said parachute comprises the canopy 32 or 32', and the shroud lines 34 connected to the harness 36 strapped as usual about the wearer. In the embodiment shown, I have shown a standard type of harness 36 having the riser straps 38 extending from each shoulder of the harness upwardly to the four links 40. The four links 40 are connected by the elastic shroud lines to the canopy, said shroud lines being connected to the canopy at spaced intervals along the outer edge thereof. Prior to being opened the parachute is carried in the pack 42 on the parachutist's back supported by the harness 36. I have shown in the drawings a standard type of pack in which the base 41 of the pack 42 is oval and is permanently held on the parachutist's back by the harness 36 and in which the riser straps 38 are infolded over the base and the shroud lines 34 folded in one loop 44 on the base 41 underneath the canopy 32 folded as usual over the base. In the embodiment shown, the cover 48 for the pack is part of the pilot chute 50 which is connected by the usual pilot chute shroud lines 52 to the apex ring 54 of the canopy 32. In the embodiment shown I have shown a standard type of rip-cord 56 operated by the usual handle 58 to pull the cable 60 loose which fastens the cover 48 to the pack base 41 over the packed canopy 32 and shroud lines 34.

As stated hitherto, my invention comprises said canopy 32 and elastic suspension means consisting of a plurality of individual shroud lines 34 connected to said canopy at spaced intervals along the outer edge thereof and suitably connected to the parachutist 62 preferably through the medium of the harness 36 in the manner just explained.

Figure 4:
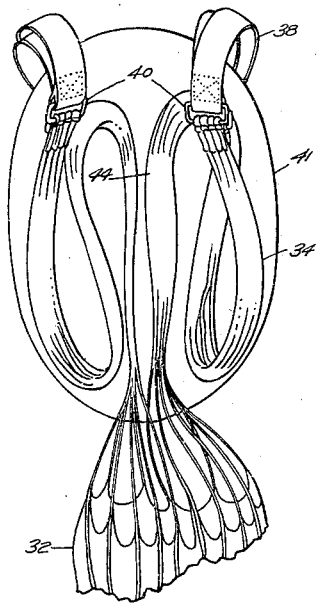
Fig. 4 is a diagrammatic plan view illustrating how the shroud lines constructed in accordance with my invention are packed in a standard pack.
Figure 3:
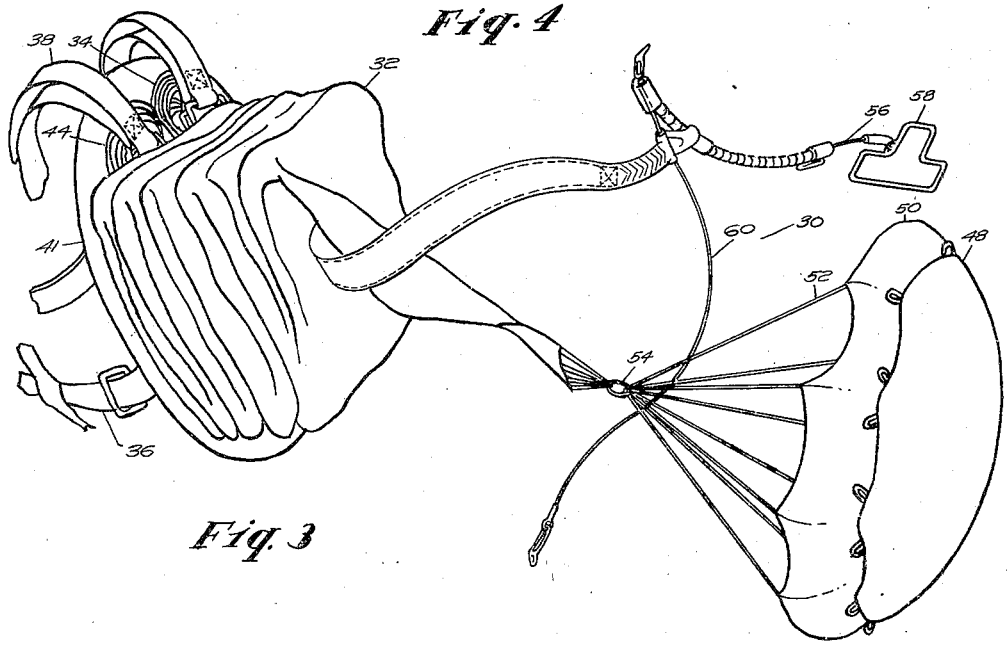
Fig. 3 is a diagrammatic perspective view of my invention applied as a back pack on a standard type of parachute illustrating the parts just after the rip-cord has been pulled and the pilot chute opened.

In accordance with this invention, each shroud 34 comprises a stretchable core consisting of rubber elastic threads 64 and a casing 66, the latter being stretchable to a less extent than the elastic limit of said elastic core. The elastic threads of the core are capable of a large extension, preferably from 200 to 500%, to wit from a contracted short length when the shroud is packed as shown in Figs. 1, 3 and 4, to a maximum extension when the shroud is stretched as shown in Fig. 14 in cushioning the shock of opening. The shroud is contractable to a partial extension as shown in Figs. 2, 15—18 as the descending parachute swings to a vertical position to yieldingly carry the parachutist in said vertical position as shown in Figs. 2, 15—18 riding on said elastic core as he drops and with a sufficient reserve of elasticity to substantially prevent any tendency of the canopy to oscillate from being imparted to the parachutist as shown in Fig. 17. Thus he may land with lessened shock as shown in Fig. 18 substantially in a vertical position, said shroud lines 34 then rapidly contracting to fully contracted position to temporarily steady the parachutist in a vertical position and to immediately pull the canopy to collapsed position as shown in Fig. 19 as the parachutist strikes the ground.

I have found that where rubber is employed as the elastic medium, it is necessary to have a fully and evenly cured rubber of sufficient strength to cushion the impact shock of opening and to support the parachutist preferably with the necessary reserve of elasticity to prevent oscillation and I have constructed the elastic core of my improved shroud lines so that they may maintain this condition. I have discovered that if one attempts to use a single strand of rubber of sufficient strength for the entire elastic core of a shroud line that it cures too much on the outside and becomes brittle and cracks easily. I employ as the elastic supporting means a substantial number, for an adult parachutist at least 10, preferably between 10–28 individual shroud lines. I employ as the elastic core of each shroud preferably between 5–30 rubber strands 68 preferably of less than size 20 (20 per inch) so that each may be fully cured, preferably 25 strands of size 24 (24 per inch) in each shroud. Each core is stretchable to extended position only on the application of a weight of approximately 5–50 lbs. It is obvious however that when constructing a parachute to drop youths, or material these figures may be correspondingly varied. While any suitable type of rubber may be employed, I have obtained best results by using Para quality cut rubber.

Figure 5:
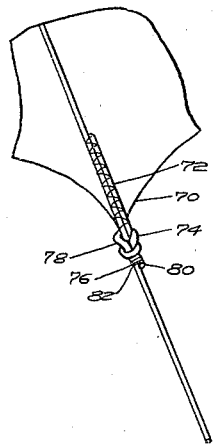
Fig. 5 is a diagrammatic perspective view showing one embodiment of a shroud line constructed in accordance with my invention attached to a portion of the canopy and to a riser strap.

The inelastic casing 66 preferably comprises a single stretchable tubular braided covering stretchable to less than the elastic limit of said elastic portion 64, said core being capable as above noted of extension preferably from 200–500 per cent. The core is extensible from a minimum length to a maximum extension, and in so stretching, acts to cushion at least 5 lbs., preferably 5 to 50 lbs. of the shock of opening, the remainder being taken up by the covering. It is apparent that with this construction the braided outer covering may be made of much less strength than that required to solely support the parachutist or to take up the entire impact shock of opening as was necessary in former constructions as most if not all of the impact shock, since explained, is always taken up by the extensible elastic portion or core of the shroud lines. This structure makes possible the use of many less shroud lines than formerly were thought necessary with their extra cost, weight and tendency to tangle. In the embodiment shown I have employed 32 ends of 7-ply 210 denier nylon, each individual end testing to stand a minimum of 14 lbs. although it is obvious that silk or other suitable synthetic or natural fibres may be employed. The shroud lines 34 may be suitably attached to the canopy 32 at desired spaced intervals thereof in any suitable manner. If desired, the elastic portion 64 of the shroud lines may be made coextensive with the length of the stretchable braided portion 66 thereof in which case each individual shroud line may be connected to the desired point 70 of the canopy and to its respective link 40 in any suitable manner such as in the manner shown in Fig. 5. As shown, a piece of braid 72 may be folded on itself to provide a loop 74 and sewed or otherwise secured along the desired spaced line 70 in the canopy and the upper end 76 of the shroud line tied within said loop by the reef knot 78 shown therein with the free end 80 bent back on itself and secured by the rubber tape 82 to its respective end 76. A piece of braid 84 may be looped around each link 40 and the lower end 86 of the shroud line 34 may be tied by the reef knot 88 to said loop 84 with the free end 90 thereof similarly taped by the tape 92 to the lower portion 86 of said shroud line.

Figs. 6–9 illustrate the construction of shroud lines I preferably employ and illustrate the relative size and shape of the elastic and inelastic portions when fully contracted or stretched to fully extended position, employing the multi-strand center core 64 and extensible covering 66. It is apparent that any suitable types of shroud lines having elastic and stretchable portions may be employed and attached in any suitable manner other than shown.

I have shown in Figs. 1, 2 and 10 my invention applied to a "shallow," so called "flat top" or "paratrooper chute" in which the canopy 32 is a small portion of a sphere of wide area so as to form a sharp stop for the paratroopers who would normally drop from less height than that at which an aeroplane usually travels. In Fig. 11 however, I have shown my invention employed on a "deep" parachute, of the standard United States Army or Navy aeroplane type canopy 32' which is nearly hemispherical. In order that the canopy may open up in a satisfactory manner in use it is essential that it be so shaped and that the shroud lines 34 be connected at such spaced intervals to the edge of said canopy that said canopy will readily open up and stay open during the drop. I have found that by employing a "deep" canopy whether it be of the standard United States Army or Navy aeroplane type, a conical canopy or otherwise, that there is so much area enclosed by the depending walls of the canopy that the number of lead lines is immaterial and may be increased up to the standard 24 or more now used on former parachutes of this type, although a lesser number may be used if desired. I have also found however that where a "shallow" "flat top" or "paratrooper chute" canopy 32 is employed that if too many shroud lines are employed therewith with too great elasticity that they will tend to prevent the canopy from opening up or will tend to collapse it after it is once opened and that with this type of canopy as shown in Figs. 1, 2 and 10 it is desirable that a smaller number of shroud lines 34 be used which are preferably connected to said canopy at such spaced intervals along the outer edge thereof as at 70 as to provide large preferably sector shaped buoyant anti-collapse lobes 100 intermediate said connections to provide sufficient area of canopy ballooning upwards in said lobes to permit said canopy to open up and stay open without collapse during the drop and therefore in my preferred embodiment I have reduced the standard number of shroud lines from 28 to 14 to provide such lobes 100 which preferably extend from the outer edges 102 thereof preferably in sector shape to the center ring of the canopy as at 104. The use of the larger lobes is believed to be made possible by the use of the elastic shroud lines in association therewith to cushion the impact strain and shock on the material of the canopy. It is apparent that with a smaller number of shroud lines, large savings in material, cost and weight are effected in the parachute without impairing its efficiency.

In the "shallow" embodiment 30 shown in Figs. 1, 2 and 10 the elastic portion or core of each shroud line is capable of taking up from about 12 to about 50 lbs. in moving from contracted to extended position and it is apparent that with 14 lines capable of taking up 20 lbs. approximately 280 lbs. of the shock of opening is taken up by the shroud lines alone. Deducting the weight of the parachutist, normally about 150 lbs. therefrom, leaves a reserve elasticity in the chute shown of 130 lbs., sufficient to take up and prevent all oscillations during the drop and enable the parachute to land in the manner shown. The reserve elasticity may be reduced to any reasonable amount for the purpose desired, sufficient to prevent the oscillations during the drop. It is obvious however that the more weight the rubber in the shroud lines takes to move them to their fully extended positions, the more the impact shock of opening is taken up and therefore on a standard Army or Navy aeroplane parachute such as shown in Fig. 11, with 24 lead lines each capable of taking up 45–50 lbs. of shock in which rubber is employed, it is apparent that well over a thousand pounds of the impact shock of opening may be taken up. It is thus apparent that by varying the number of strands and the number of shroud lines, wide variations are possible to substantially eliminate the impact shock of opening if desired or to provide reserve elasticity necessary to prevent oscillation. Employing a smaller number of shroud lines however to permit the formation of buoyant supporting lobes 100, it is apparent that I provide an advantageous structure whether or not sufficient reserve elasticity to prevent oscillations be employed in the structure of the shroud lines.

Figs. 12–19 illustrate how my improved parachute functions when dropped from a moving plane in use to greatly lessen or substantially eliminate the shock of opening, to substantially prevent any oscillation during dropping caused either from the pendulum action caused by the initial drop from a horizontal to a vertical position or by gusts of wind during flight and how the shroud lines additionally function to lessen the shock of landing to steady the parachutist in a vertical position and quickly collapse the parachute in the manner explained in detail in the description of the respective figures. For the sake of comparison of the action of my improved parachute with that of a standard parachute I have shown substantially corresponding Figs. 112–119 of a standard parachute having non-extensible shroud lines which illustrates the great impact shock of opening, the fact that the parachute initially tends to oscillate due to the pendulum action provided in dropping from a horizontal to a vertical position which tends to continue during a large portion of the drop, the supplemental oscillations provided by gusts of wind during each drop and the ill effects provided by oscillation during landing and failure of the parachute to immediately collapse, all of which are well-known in the art but are merely inserted here to diagrammatically distinguish from companion actions of my improved parachute which tends to eliminate many of the disadvantages of prior art parachutes. These drawings, namely, Figs. 12–19, have been made by carefully watching actual tests of my improved parachute. Jumpers have substantiated the fact that with my parachute the impact shock of opening is substantially overcome, all oscillations during dropping are substantially eliminated and that the parachutist is yieldingly landed on his feet without sway and given a temporary support to stay on his feet while the parachute itself immediately collapses. The many drops which have been made confirm this action.

I employ the word "parachutist" in the claims to include material or any other kind of load being dropped.

It is apparent, therefore, that I provide a novel type of parachute with the advantages explained above.

It is understood that my invention is not limited to the specific embodiments shown and that various deviations may be made therefrom without departing from the spirit and scope of the appended claims.

What I claim is:

1. A parachute comprising a canopy and a plurality of individual elastic shroud lines connected to said canopy at spaced intervals along the outer edge thereof and comprising the sole support of the load from the canopy each of said shroud lines comprising a multiplicity of rubber strands making up the elastic core thereof, and a stretchable braided covering therefor stretchable to less than the elastic limit of said elastic core, said core and covering being of such a strength and resiliency that the normal load in descent stretches the lines to less extent than the shock load of opening so that said core may be extensible from a contracted short length for packing purposes to a maximum extension to cushion the shock of opening, contractable to a partial extension as the descending parachute swings to a vertical position to yieldingly carry the load in said vertical position on said elastic core as it drops, with a sufficient reserve of elasticity to substantially prevent any tendency of the canopy to oscillate from being imparted to the load so that it may land with lessened shock substantially in a vertical position and rapidly contractable to fully contracted position to temporarily steady the load in a vertical position and to immediately pull the canopy to collapsed position as the load strikes the ground, said canopy being so shaped and said shroud lines being connected at such spaced intervals to the edges of said canopy that said canopy will readily open up and stay open during the drop.

2. In a parachute assembly, a canopy, load attaching means, and a plurality of shroud lines comprising the sole support of the load from the canopy secured to said load attaching means and to the canopy at spaced points around its edge, each of said shroud lines comprising a longitudinally extensible elastic element of such strength and resiliency that the normal load in descent stretches the line to a less extent than the shock load of opening, and a limiting element longitudinally extensible to a lesser degree than said elastic element to limit the extension of the elastic element to a degree less than its limit of elasticity whereby the elastic element will cushion the application of force to the load upon the shock of opening of the canopy until the limiting element reaches its limit of extension and thereafter said elastic element will support the load independently of said limiting element.

EDWARD R. BOLAND.

REFERENCES CITED

The following references are of record in the file of this patent:

UNITED STATES PATENTS

| Number | Name | Date |
|---|---|---|
| 1,619,342 | Gammeter | Mar. 1, 1927 |
| 1,025,386 | Ensslin | May 7, 1912 |
| 1,273,553 | Upson | July 23, 1918 |
| 1,816,927 | Brown | Aug. 4, 1931 |
| 2,356,493 | Smith | Aug. 22, 1944 |
| 1,340,259 | Taylor | May 18, 1920 |

FOREIGN PATENTS

| Number | Country | Date |
|---|---|---|
| 30,865 | France | June 22, 1926 |

Certificate of Correction

Patent No. 2,418,456.   April 8, 1947.

EDWARD R. BOLAND

It is hereby certified that errors appear in the printed specification of the above numbered patent requiring correction as follows: Column 10, line 22, after the word and period "element." insert the following claim:

> 3. An elastic suspension designed to constitute the sole means for connecting the canopy of a parachute to the load attaching elements, said suspension consisting of a set of substantially like shrouds and being operative, while sustaining a riding load, to damp the transmission of canopy oscillation to said load, each shroud of the set comprising a longitudinally extensible elastic core consisting of approximately 25 substantially parallel, substantially like rubber threads of approximately size No. 24, the core alone being stretchable from 200% to 500% and being of such strength and resiliency that it requires a load of from 12 to 50 pounds to extend it from fully contracted to fully extended length whereby the normal riding load, in descent, stretches the shroud to a lesser extent than results from the shock load of opening, and a single-walled tubular casing for the core, said casing comprising interbraided plied yarns, the casing being longitudinally extensible to a lesser amount than the elastic core and thus being operative to limit extension of the elastic core.

in the heading to the printed specification, line 7, for "2 Claims." read *3 Claims.*; and that the said Letters Patent should be read with these corrections therein that the same may conform to the record of the case in the Patent Office.

Signed and sealed this 3rd day of June, A. D. 1947.

[SEAL]

LESLIE FRAZER,
*First Assistant Commissioner of Patents.*